(12) United States Patent
Käsbauer et al.

(10) Patent No.: US 9,793,666 B2
(45) Date of Patent: Oct. 17, 2017

(54) ELECTRICAL APPARATUS HAVING A TOP-HAT RAIL MOUNT AND A CONDUCTOR CONNECTION

(75) Inventors: Peter Käsbauer, Schwandorf (DE); Johann Seitz, Amberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 224 days.

(21) Appl. No.: 14/417,586

(22) PCT Filed: Aug. 6, 2012

(86) PCT No.: PCT/EP2012/065349
§ 371 (c)(1),
(2), (4) Date: Mar. 21, 2015

(87) PCT Pub. No.: WO2014/023328
PCT Pub. Date: Feb. 13, 2014

(65) Prior Publication Data
US 2015/0288116 A1    Oct. 8, 2015

(51) Int. Cl.
*H01R 9/26* (2006.01)
*H01R 25/16* (2006.01)
(Continued)

(52) U.S. Cl.
CPC ......... *H01R 25/162* (2013.01); *H01R 9/2675* (2013.01); *H02B 1/052* (2013.01); *H01H 71/08* (2013.01); *H01R 4/363* (2013.01)

(58) Field of Classification Search
CPC ...... H01R 25/62; H01R 9/2675; H01R 4/363; H02B 1/052; H01H 71/08
(Continued)

(56) References Cited

U.S. PATENT DOCUMENTS 4,100,517 A * 7/1978 Rodolfi ............... H01H 50/042
                                                     335/132
4,171,861 A * 10/1979 Hohorst ............... H01R 4/4845
                                                     439/49
(Continued)

FOREIGN PATENT DOCUMENTS

CN       200941719 Y     8/2007
DE        1942300 A1     3/1971
(Continued)

OTHER PUBLICATIONS

Extended European Search Report dated Feb. 1, 2016.
(Continued)

*Primary Examiner* — Amy Cohen Johnson
*Assistant Examiner* — Milagros Jeancharles
(74) *Attorney, Agent, or Firm* — Harness, Dickey & Pierce, P.L.C.

(57) ABSTRACT

An electrical apparatus includes a top-hat rail mount and a first conductor connection with a clamping point. A conductor can be secured via the clamping point. The electrical apparatus can be connected to a top-hat rail via a rotational movement about a rotational axis at the top-hat rail mount. In an embodiment, the first conductor connection be embodied and arranged in such a way that in the state in which the apparatus is connected to the top-hat rail via its top-hat rail mount, the longitudinal axis of a straight conductor which is accommodated in the first conductor connection is located essentially perpendicularly with respect to a straight line which is oriented orthogonally with respect to the rotational axis and which intersects the rotational axis and the clamping point.

13 Claims, 4 Drawing Sheets

(51) Int. Cl.
*H02B 1/052* (2006.01)
*H01H 71/08* (2006.01)
*H01R 4/36* (2006.01)

(58) Field of Classification Search
USPC ............ 439/121, 716, 620.33; 361/437, 600
See application file for complete search history.

(56) References Cited

U.S. PATENT DOCUMENTS

| | | | |
|---|---|---|---|
| 5,486,979 A | | 1/1996 | Bowen et al. |
| 5,602,363 A * | | 2/1997 | Von Arx ................ H02B 1/052 174/559 |
| 5,641,313 A * | | 6/1997 | Hohorst ............... H01R 9/2658 439/709 |
| 8,011,962 B2 * | | 9/2011 | Pizzi ...................... H01R 4/363 439/607.41 |
| 8,128,435 B2 * | | 3/2012 | Trinh ................... H01R 9/2491 439/661 |
| 2008/0164130 A1 * | | 7/2008 | Adunka ............. H01H 11/0031 200/293 |
| 2015/0229045 A1 * | | 8/2015 | Falk ..................... H01R 9/2608 439/121 |

FOREIGN PATENT DOCUMENTS

| | | |
|---|---|---|
| DE | 102 30 292 B3 | 1/2004 |
| EP | 0 472 409 A1 | 2/1992 |
| EP | 1 137 035 A1 | 9/2001 |
| WO | WO 9304514 A1 | 3/1993 |

OTHER PUBLICATIONS

International Search Report PCT/ISA/210 for International Application No. PCT/EP2012/065349 dated Mar. 21, 2013.
Written Opinion of the International Searching Authority PCT/ISA/237 for International Application No. PCT/EP2012/065349 dated Mar. 21, 2013.
Chinese Office Action and English translation thereof dated Dec. 3, 2015.

* cited by examiner

ELECTRICAL APPARATUS HAVING A TOP-HAT RAIL MOUNT AND A CONDUCTOR CONNECTION

PRIORITY STATEMENT

This application is the national phase under 35 U.S.C. §371 of PCT International Application No. PCT/EP2012/065349 which has an International filing date of Aug. 6, 2012, which designated the United States of America, the entire contents of which are hereby incorporated herein by reference.

FIELD

At least one embodiment of the invention relates to an electrical device with a top-hat rail mount and a conductor connector having a clamping point. The electrical device is, in particular, a switching device in the field of low-voltage switchgear technology.

BACKGROUND

For the purpose of simplifying the connection of several electrical devices (e.g. mechanical or electronic motor control units or contactors) to a voltage source (e.g. a 3-phase a.c. system), the devices are often connected to the voltage source in combinations, by way of a busbar. For this purpose, the busbar usually comprises fixed-position contact pins, by which electrical contact is effected to the appropriate conductor connectors on the devices. The use of a busbar enables the time-consuming individual wiring of the devices to be eliminated.

Electrical connection of devices by way of a busbar is also referred to as combination structuring. In the case of switchgear, a combination is generally implemented using a rigid supply feed system (busbar). Important advantages of such a system are the reduction in the wiring effort, and the avoidance of wiring errors.

If individual devices are attached onto a top-hat rail and connected via a busbar, a critical disadvantage of such a linkage is that the withdrawal of an individual device, or the exchange of a device, can only be effected by the complete disassembly of the busbar, because only in this indirect way can the devices be individually taken off the top-hat rail again. For example, if a combination of five devices is attached to a top-hat rail, and if each of the devices is connected to contact pins on the busbar by three conductor connectors, each of which is in the form of a screw conductor connector, then, if a device replacement is necessary for one of the five devices, the busbar must first be disassembled. In order to remove the busbar, 15 screws on the conductor connectors must first be undone. After the removal of the busbar, the device can then be exchanged and the combination must then be reconnected to the busbar. For this purpose, all 15 screws must be tightened up.

SUMMARY

At least one embodiment of the present invention is directed to a device replacement for an electrical device which is connected to a top-hat rail and a busbar.

A fixture is disclosed in an embodiment, i.e. by an electrical device with a top-hat rail mount and a first conductor connector having a clamping point, where a conductor can be fixed by way of the clamping point, where the electrical device can be joined to a top-hat rail by way of a rotational movement about an axis of rotation at the top-hat rail mount, where the first conductor connector is shaped and arranged in such a way that, in the state where the device is joined to the top-hat rail by way of its top-hat rail mount, the longitudinal axis of a straight conductor which is accommodated in the conductor connector is essentially perpendicular to a straight line which is aligned orthogonally to the axis of rotation and passes through the axis of rotation and the clamping point.

Advantageous developments of the invention are specified in the dependent claims.

The mechanical joint of the device to the top-hat rail is, in particular, a releasable joint. Preferably, the device is latched onto the top-hat rail.

The electrical device can be joined to the top-hat rail by a first rotational movement about the axis of rotation, and can be released from the top-hat rail by a second rotational movement about the axis of rotation, in the opposite sense from the first rotational movement.

The straight line passes through a straight conductor which is accommodated, in particular in the region of the clamping point.

By way of the clamping point, the conductor (for example a contact pin on a busbar) can by mechanically fixed. Further, the clamping point has an electrically conducting bond to an internal component in the device, so that a conductor which is accommodated in the clamping point has an electrically conducting bond to the internal components of the device.

The term 'essentially perpendicular' is to be understood as meaning that the angle formed between the longitudinal axis of the straight conductor and the straight line lies between 70° and 115°, preferably at about 90°.

The conductor connector, in particular its clamping point, is shaped and arranged in such a way that, in the state where the device is joined to the top-hat rail by way of its top-hat rail mount, the introduction of the straight conductor into the clamping point and the release of the straight conductor from the clamping point, out of the conductor connector, is effected by a movement of the conductor essentially perpendicularly to the straight line which is aligned orthogonally to the axis of rotation and which passes through the axis of rotation and the clamping point.

Instead of a straight conductor, the electrical device can equally well be connected to a contact pin on a busbar. In this case, the part of the contact pin which projects into the device at the clamping point must only have a longitudinal section which is oriented essentially perpendicular to the straight line. It is possible, by way of the contact pin on a busbar, to connect electrically several devices which are attached to the same top-hat rail.

The conductor connector is preferably a screwed connector.

By way of a shaping and arrangement of this type for the conductor connector, it is possible to release the device from the top-hat rail in spite of having a conductor with a fixed spatial position. Further, it is possible to couple the device onto the top-hat rail when the conductor already has a fixed spatial position. A conductor with a fixed spatial position is, in particular, a conductor which keeps its position unaltered relative to the top-hat rail. This is in particular the case when, for example, a busbar is already mechanically joined to devices in adjacent positions.

The conductor connector is, in particular, shaped and arranged in such a way that when the device is released from the top-hat rail a contact pin, which is accommodated in the conductor connector of a busbar which is in addition joined mechanically to a device, which has the same form of construction and is adjacent to it when the devices are coupled to the top-hat rail, retains its spatial position.

In an advantageous embodiment of the invention, the conductor connector comprises a conductor insertion guide. The conductor can be inserted into the clamping point via the conductor insertion guide.

The first conductor connector is shaped and arranged in such a way that, in the state where the device is joined to the top-hat rail by way of its top-hat rail mount for the purpose of joining a conductor electrically and mechanically to the clamping point of the first conductor connector, the conductor can be fed through the entire conductor insertion guide (i.e. from the outside of the device housing up to the clamping point) into the clamping point by way of a movement which is essentially perpendicular to the straight line which is oriented orthogonally to the axis of rotation and which passes through the axis of rotation and the clamping point.

For the purpose of joining the conductor mechanically and electrically to the clamping point, the direction of movement of the conductor is essentially perpendicular to the straight line, i.e. the angle between the longitudinal axis, of the conductor which is being fed to the clamping point, and the straight line lies between 70° and 115°, in particular at about 90°.

In a further advantageous embodiment of the invention, the top-hat rail mount is arranged on a first side of the electrical device. On a second side of the device, which abuts the first side of the device, the first conductor connector is arranged in such a way that the conductor is inserted into the first conductor connector via the second side. Hence the opening of the conductor insertion guide is located on the second side.

The second side is, in particular, arranged to be perpendicular to the first side.

The longitudinal axis of a straight conductor which is accommodated in the conductor connector is, in particular, set at an angle to the first and second sides of the device.

A straight conductor which is accommodated in the conductor connector projects out of the second side at an angle, in particular, of between 35° and 80°, in particular about 60°.

The direction of the travel movement made during the fixing or release of the clamping point of the conductor connector is, in particular, parallel to the straight line and preferably lies directly along the line of the straight line.

The clamping point is preferably operated by way of a screw. The screw is preferably set at an angle to the first and second sides of the device. In particular, the longitudinal axis of the screw is aligned parallel to the straight line, and preferably lies directly along the line of the straight line.

In a further advantageous embodiment of the invention, the electrical device comprises a further first conductor connector with a clamping point, where this further first conductor connector is shaped and arranged in such a way that, in the state where the device is joined to the top-hat rail by way of its top-hat rail mount, the longitudinal axis of a straight conductor which is accommodated in the further first conductor connector is essentially perpendicular to a straight line which is aligned orthogonally to the axis of rotation, and passes through the axis of rotation and the clamping point of the further first conductor connector. The conductor is inserted into the further first conductor connector via the second side and each of the clamping points for the first conductor connectors are at the same distance from the axis of rotation. The distance concerned is, in particular, in each case the smallest possible distance between the clamping point and the axis of rotation.

It follows that the further first conductor connector is arranged with a sideways offset relative to the first conductor connector. The first conductor connectors are preferably at the same distance from the first side of the device.

The further first conductor connector is preferably of the same constructional shape as the first conductor connector. Hence it can also comprise a conductor insertion guide.

The device preferably has three conductor connectors of the same constructional shape, arranged with a sideways offset from one another. The distance from the individual conductor connectors to the axis of rotation is the same.

In a further advantageous embodiment of the invention, the electrical device comprises a second conductor connector with a clamping point, where the second conductor connector is shaped and arranged in such a way that, in the state where the device is joined to the top-hat rail by way of its top-hat rail mount, the longitudinal axis of a straight conductor which is accommodated in the second conductor connector is essentially perpendicular to a straight line which is aligned orthogonally to the axis of rotation and passes through the axis of rotation and the clamping point. The conductor is inserted into the second conductor connector via the second side. The distance from the clamping point of the second conductor connector to the axis of rotation is not the same as the distance from the clamping point of the first conductor connector to the axis of rotation. The distance concerned is, in particular, in each case the smallest possible distance between the clamping point and the axis of rotation.

The second conductor connector is preferably of the same constructional shape as the first conductor connector. Hence the second conductor connector can also comprise a conductor insertion guide.

The second conductor connector, in particular its conductor insertion guide and/or clamping point, is further away from the first side or the axis of rotation of the device than the first conductor connector, or its conductor insertion guide and/or clamping point, as applicable.

In a further advantageous embodiment of the invention, the device is a switching device, in particular a softstarter, motor starter, motor switching device, contactor or relay.

Through the conductor connector of the device or the conductor connectors of the device, as applicable, power is preferably supplied to a downstream consumer, in particular an electrical motor. Preferably, the power supply to the downstream consumer can be controlled by way of the device.

Preferably, the power supply to a downstream consumer (e.g. a 3-phase electrical motor) can be fed through three conductor connectors (first and/or second conductor connectors).

In further advantageous embodiment of the invention, a system comprises a busbar with contact pins and a first and a second electrical device as claimed in one of the claims 1 to 5.

The first and second device can each be attached to the same top-hat rail using the top-hat rail mount, so that the two devices are arranged alongside each other on the top-hat rail. As a result the first conductor connector or the first conductor connectors, as applicable, of the first and second devices are each joined directly to one of the contact pins of the busbar. If the second side is oriented perpendicularly to the top-hat rail, the contact pins which are being accommodated project into the conductor connector concerned obliquely relative to the second side of the device concerned. The longitudinal axis of the contact pin which is accommodated in the conductor connector projects out of the second side at an angle, in particular, of between 35° and 80°, in particular about 55°.

If a second conductor connector is present on the devices, it is preferably also joined directly to a contact pin of the same or a further second busbar. The contact pins of the busbar also project into the second conductor connector concerned at an oblique angle to the second side.

The first conductor connector of the devices, and if present the second one, is arranged and shaped in such a way that the first or second device can be released from the top-hat rail without the need to release both devices from the top-hat rail and without the need to extract the busbar/s from both devices.

If both devices are joined to the top-hat rail and one busbar and if, for example, the second device is to be replaced, then it is not necessary to disassemble the entire system (first and second device) from the top-hat rail. Furthermore, it is not necessary to undo the busbar from both devices. It is sufficient to undo the mechanical fixing of the contact pin/contact pins of the busbar on the second device. The second device can then be turned about its axis of rotation, off the top-hat rail, so that the mechanical joint to the top-hat rail is released. During this time, the busbar with its contact pins remains unaltered in its position, because it continues to be held by the first device. After the second device has been removed, a new device of the same constructional shape can be joined to the top-hat rail. The operation of latching onto the top-hat rail automatically moves the appropriate conductor connectors of the new device of the same constructional shape onto the contact pins of the busbar. If the clamping points are operated by way of screws, then after the mechanical attachment of the second device onto the top-hat rail it is only necessary to operate the screw for the clamping point concerned, so that the contact pins are mechanically fixed.

If a further device of the same constructional shape is to be joined onto the busbar, then the further device need only be attached to the top-hat rail. If necessary, the clamping points of the device must then be used to fix the contact pins of the busbar.

The contact pins of the busbar are, in particular, fixed-position contact pins.

In an advantageous embodiment of the invention, the axis of rotation of the device lies on the upper seating for the top-hat rail mount on the top-hat rail.

BRIEF DESCRIPTION OF THE DRAWINGS

In what follows, the invention and embodiments of the invention are described in more detail and explained with reference to the example embodiments illustrated in the figures. These show.

DETAILED DESCRIPTION OF THE EXAMPLE EMBODIMENTS

Figure 1:
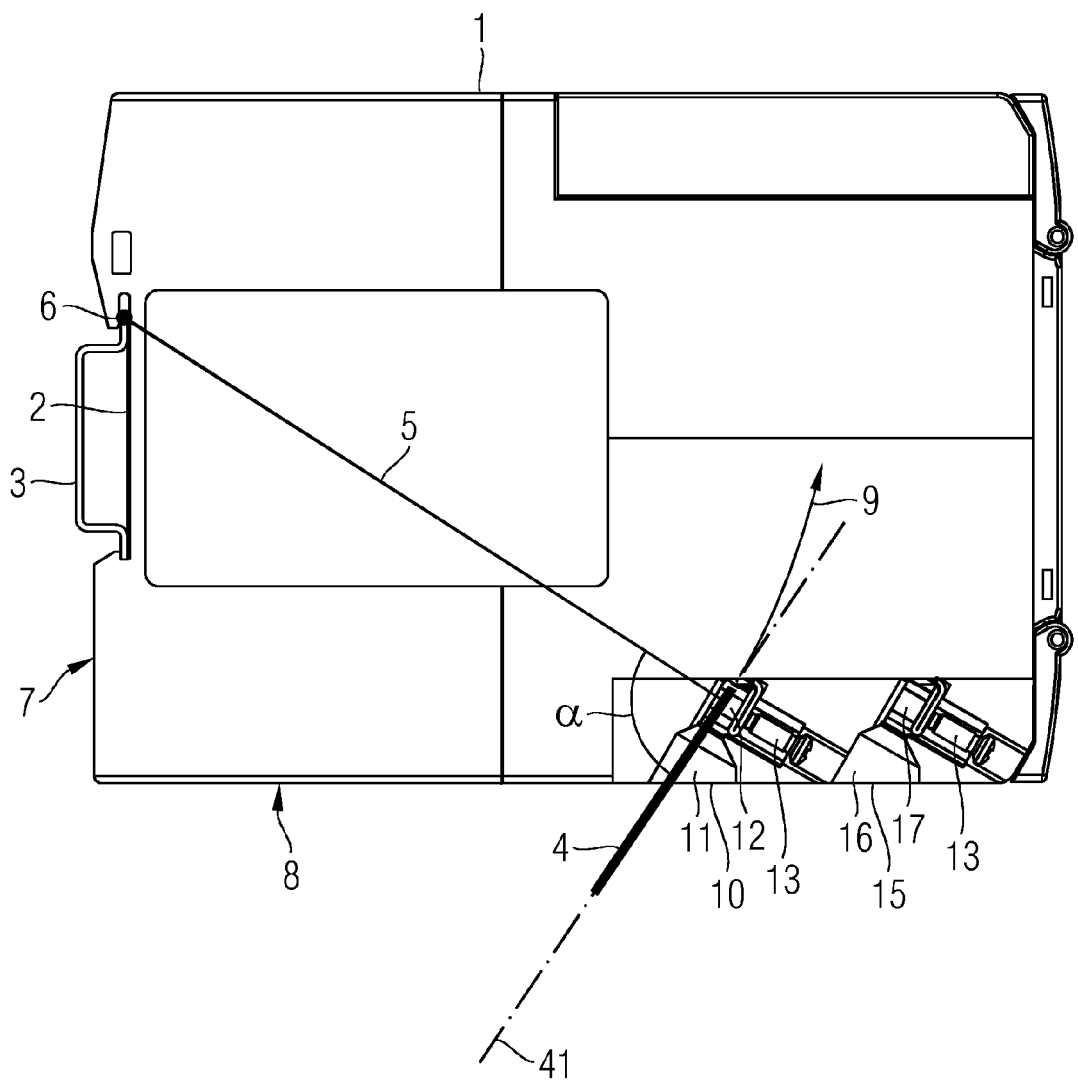
FIG. 1 a schematic representation of a side view of a device which is attached to a top-hat rail and has accommodated a straight conductor, FIG. 2 a schematic representation of a system comprising five devices, as shown in FIG. 1, which are attached to the same top-hat rail and with which contact is made via a busbar, FIG. 3 a schematic representation of a side view of the system as shown in FIG. 2, where the front device has been released from the top-hat rail, and FIG. 4 a perspective diagram of the system in FIG. 3.

FIG. 1 shows a schematic representation of a side view of a device 1, which is attached to a top-hat rail 3 and has accommodated a straight conductor 4. The electrical device 1 comprises a top-hat rail mount 2, by way of which the device 1 is attached to the top-hat rail 3, a first conductor connector 10 and a second conductor connector 15. To clarify the diagram, the region of the first and second conductor connectors 10,15 of the device 1 is shown in cutaway, so that the feeding in and fixing of the conductor 4 in the first conductor connector is visible. In this exemplary embodiment, the electrical device 1 is a motor starter and the first and second conductor connectors 10,15 are each a screw connector for a conductor 4.

The first conductor connector 10 comprises a conductor insertion guide 11, a clamping point 12 and a screw 13, by which the clamping point 12 can be operated. The second conductor connector 15 comprises a conductor insertion guide 16, a clamping point 17 and a screw 13, by which the clamping point 17 can be operated.

A conductor (e.g. a contact pin of a busbar) can be guided into the appropriate clamping point 12,17 of the conductor connector 11,15, via the appropriate conductor insertion guide 11,16. The conductor which has been inserted can be mechanically fixed by way of the clamping point 12,17. For this purpose, the screw 13 of the relevant conductor connector 11,15 must be tightened up. The clamping point 12,17 effects an electrically conducting bond of the conductor to an internal device component in the device 1. In particular, the power supply chain for a consumer connected downstream from the device 1 is connected to the first and/or the second conductor connector 11,15. For clarity, the illustration shows only one straight conductor 4, accommodated in the first conductor connector 11. The second conductor connector is constructed analogously to the first conductor connector, and can in the same way accommodate a straight conductor. The only difference is that the second conductor connector 15 is spaced further away from the top-hat rail mount 2 than the first conductor connector 11. The first and second conductor connectors 10,15 can also accommodate a conductor which is not straight. It is only necessary that the part of the conductor which is accommodated in the conductor connector 10,15 is shaped with an alignment analogous to the alignment of the straight conductor.

The top-hat rail mount 2 extends across the first side of the device 1. The first side 7 is the surface of the housing floor of the device 1.

A conductor is introduced into the first and the second conductor connector 10,15, and the clamping point 12,17 operated (here by way of a screw 17) through the second side 8 of the device 1. The second side 8 is aligned perpendicularly to the top-hat rail 3, to the top-hat rail mount 2 and to the first side 7, and directly abuts the first side 7.

The electrical device 1 can be joined to the top-hat rail 3 by a first rotational movement about an axis of rotation 6. The mechanical joint of the device 1 to the top-hat rail 3 is a joint which can be released. In order to release the device 1 from the top-hat rail 3, the device 1 must be turned about the axis of rotation 6, using a second rotational movement 9 which is in the opposite sense to the first rotational movement. The axis of rotation 6 is aligned parallel to the top-hat rail 3, and lies on the top edge of the top-hat rail 3.

The first conductor connector 10 has accommodated the straight conductor 4, so that there is an electrical bond between the conductor 4 and the clamping point 12 of the first conductor connector 10. For the purpose of a mechanical joint, it is only necessary to operate the screw 13 of the first conductor connector 10.

The first conductor connector 10 is shaped in such a way and arranged on the device 1 in such a way that, in the state where the device 1 is joined to the top-hat rail 3 by way of its top-hat rail mount 2 (the state shown in FIG. 1) the longitudinal axis 41 of the straight conductor 4 accommodated in the first conductor connector 10 is essentially perpendicular to a straight line 5 which is aligned orthogonally to the axis of rotation 6 and passes through the axis of rotation 6 and the clamping point 12, in particular through the straight conductor 4 which is accommodated and fixed in it, in the region of the clamping point 12.

The term 'essentially perpendicular' is to be understood as meaning that the angle α between the longitudinal axis 41 of the conductor 4 and the straight line 5 lies between 70° and 115°. In this exemplary embodiment, the angle α between the longitudinal axis 41 and the straight line 5 is about 90°.

The second conductor connector 15 is shaped in an analogous way to the first conductor connector 10 and is thus shaped and arranged in such a way that, in the state where the device 1 is joined to the top-hat rail 3 by way of its top-hat rail mount 2, the longitudinal axis of a straight conductor which is accommodated in the second conductor connector 15 is essentially perpendicular to a straight line which is aligned orthogonally to the axis of rotation 6 and passes through the axis of rotation 6 and the clamping point 17 of the second conductor connector 15. The conductor is introduced into the second conductor connector 15 through the second side 8, and the distance from the clamping point 17 of the second conductor connector 15 to the axis of rotation 6 is not equal to the distance from the clamping point 12 of the first conductor connector 10 to the axis of rotation 6.

The chosen geometric arrangement of the conductor connectors 10, in particular their conductor insertion guides and clamping points for the conductor which is to be connected in, enables individual devices 1 to be released from the system by a rotational movement about the axis of rotation 6, without the need for complete disassembly of the busbar 14 from the combination. In order to exchange the device 1 it is only necessary to undo the screws on the clamping point which accommodates a conductor in the device 1 which is to be released.

The conductor/contact pin for the conductor connector concerned can thus remain in its spatial position. It is possible to release the device 1 from the top-hat rail 3, and to couple the device 1 to the top-hat rail 3, even though the conductor 4 has a fixed position.

Figure 2:
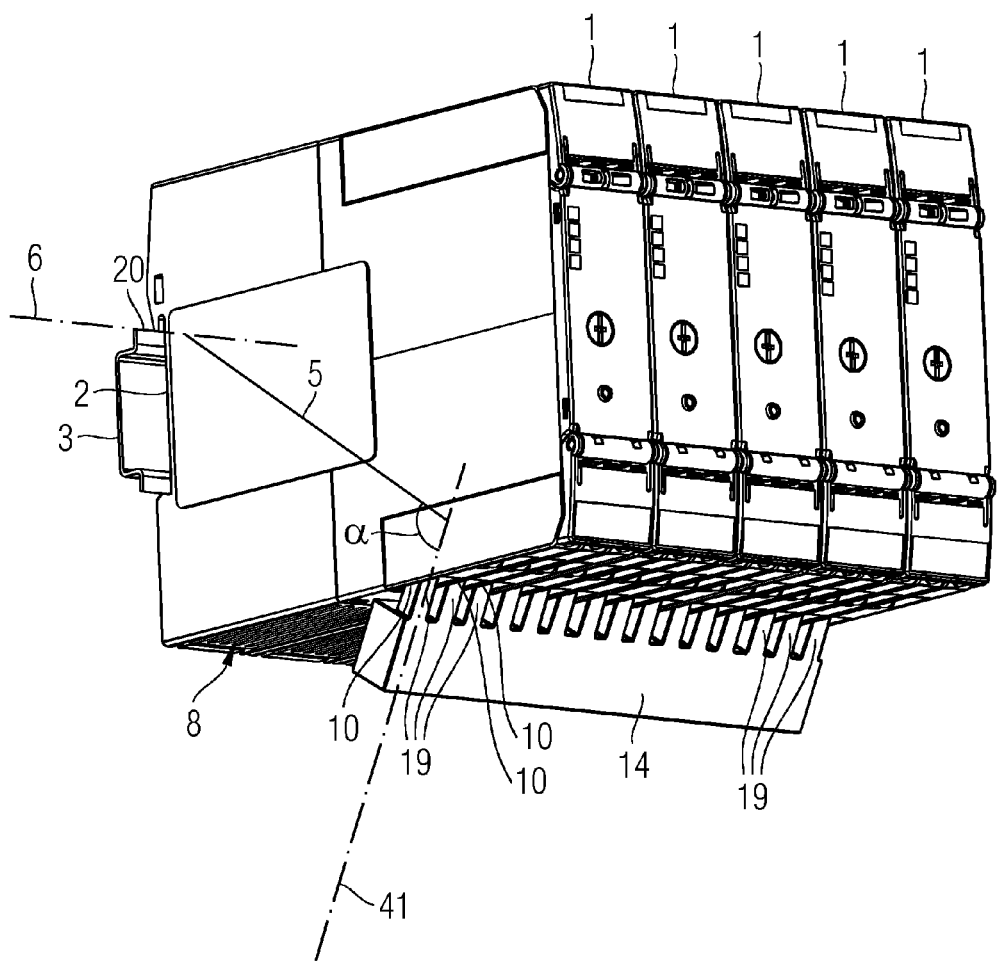

FIG. 2 shows a schematic diagram of a system comprising five devices 1 as shown in FIG. 1, which are attached to the same top-hat rail 3 and with which contact is effected via a busbar 14. Each of the devices 1 has been pivoted about an axis of rotation 6 onto the top-hat rail, so that there is a mechanical attachment of the devices 1 to the top-hat rail 3 by way of their top-hat rail mount 2. The axis of rotation 6 of the top-hat rail 3 is defined by the upper edge 20 of the top-hat rail 3. In particular, the axis of rotation 6 of the top-hat rail 3 lies along the upper edge 20.

Each of the individual devices 1 has three first conductor connectors 10 and three second conductor connectors. The three first conductor connectors 10 are arranged with a sideways offset relative to each other, and are each at the same distance from the first side of the device 1 and from the axis of rotation 6. The three second conductor connectors are arranged with a sideways offset relative to each other, and are each at the same distance from the first side of the device 1 and from the axis of rotation 6. The second conductor connectors are at a greater distance from the axis of rotation 6 than are the first conductor connectors 10.

The first conductor connectors 10 of the devices are arranged with a sideways offset relative to each other, and are each at the same distance from the axis of rotation 6.

Electrical contact is effected for the first conductor connectors 10 of the device 1 by way of the busbar 14. For this purpose, the busbar 14 comprises individual fixed-position contact pins 19, which are partially surrounded by an electrically insulating material. It is possible, by way of the fixed-position contact pins 19, to establish an electrical contact to the conductor connector concerned. The busbar simplifies the connection of several devices 1 in parallel, for example by way of the top-hat rail 3, because instead of time-consuming individual wiring it is only necessary to join the busbar 14 mechanically and electrically to the devices 1.

The angle α between the longitudinal axis 41 of that part of the contact pin 19 concerned which projects into the conductor connector 10 and the straight line 5 which is aligned orthogonally to the axis of rotation 6 and which passes through the axis of rotation 6 and the clamping point, lies between 70° and 115°. In this exemplary embodiment, the angle α between the longitudinal axis 41 and the straight line 5 is about 90°.

Due to the fact that the contact pins 19 project obliquely into the second side 8 of the device 1, it is possible to release one of the devices 1 from the top-hat rail 3 without the need to undo the busbar 14 from all the devices 1.

Figure 3:
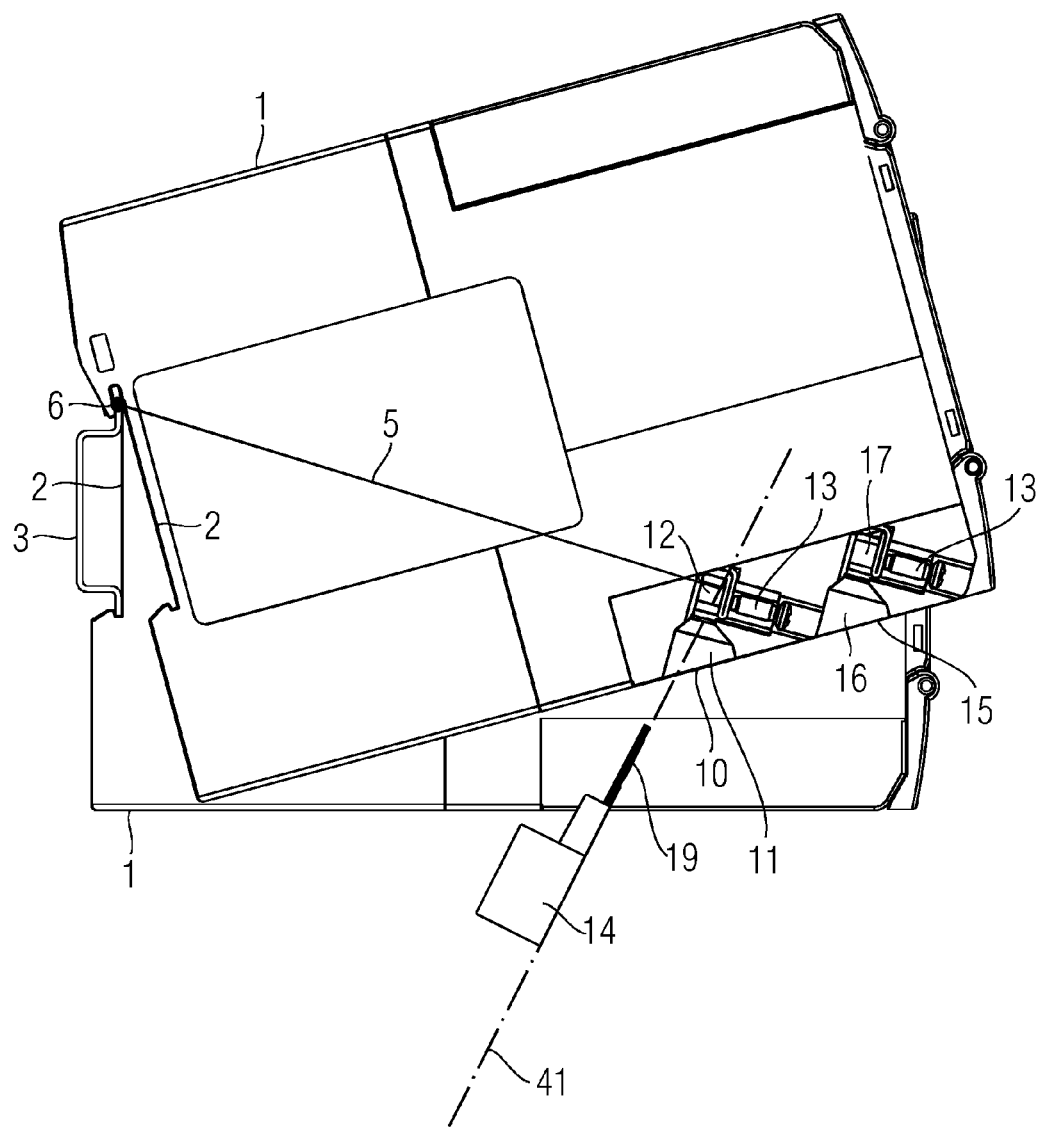
Figure 4:
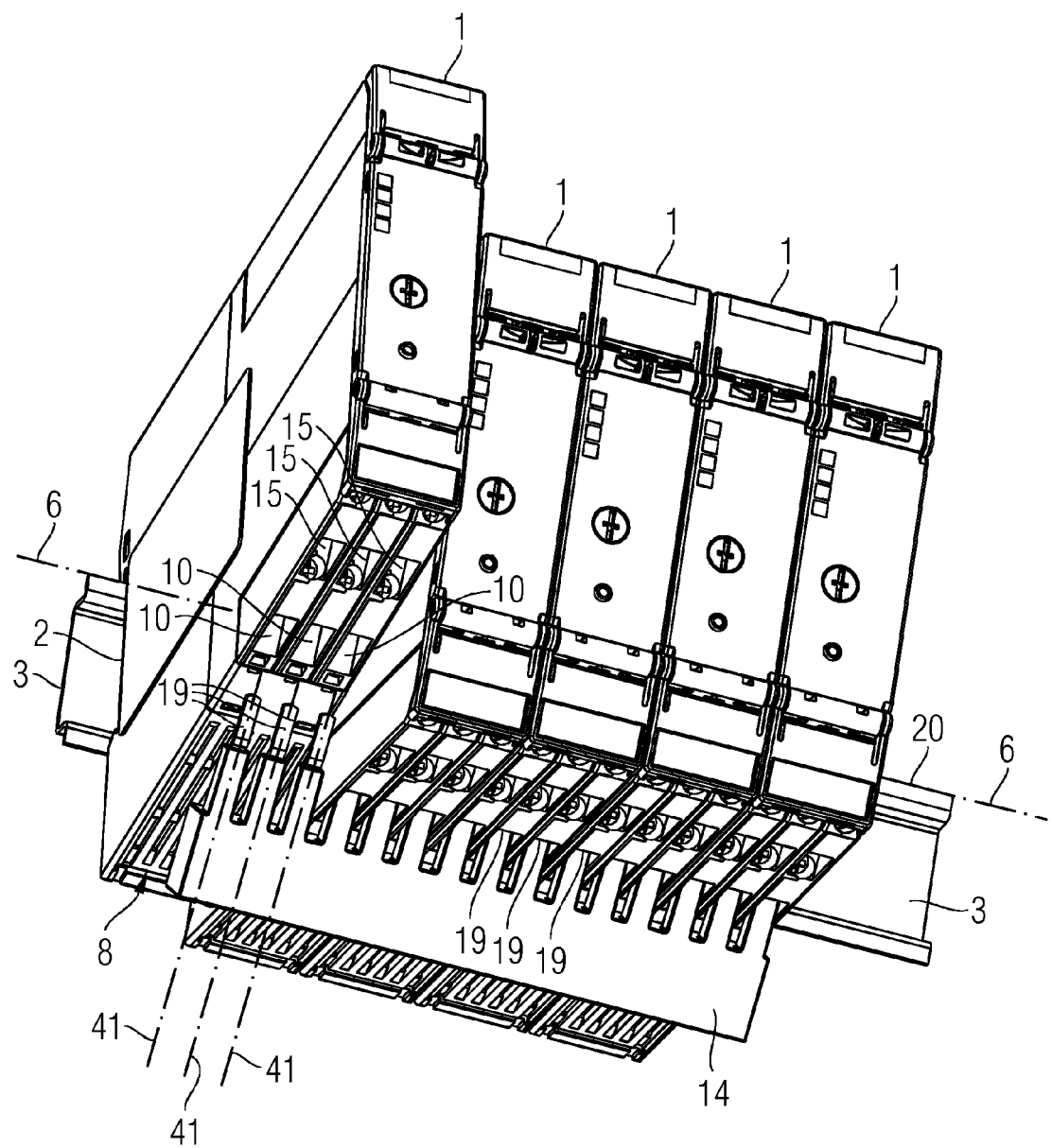

FIG. 3 shows a schematic diagram of a side view of the system shown in FIG. 2, where the frontmost device 1 has been released from the top-hat rail 3. FIG. 4 shows a perspective diagram of the system in FIG. 3. From FIG. 4, it can be seen that each of the devices 1 has on its second side 8 three conductor connectors 10 which are arranged with a sideways offset from one another, and three second conductor connectors 15 which are arranged with a sideways offset from one another.

The geometric shaping and arrangement of the first and second conductor connectors 10,15 enables the device 1 to be released from the top-hat rail 3 without the need to undo the busbar 14 from all the devices 1. For the purpose of releasing one of the devices 1 from the top-hat rail 3, it is only necessary to undo the mechanical attachments of the contact pins 19 to the clamping points on the device 1 which is to be released. The device 1 can then be released from the top-hat rail 3 by a rotational movement about its axis of rotation 6. The device 1 can now be exchanged, for example. For the purpose of joining a new device to the top-hat rail 3, it need only be pivoted around its axis of rotation 6 onto the top-hat rail 3. The fixed-position contact pins 19 automatically make contact with the associated contact points on the device which has been pivoted into position. During the exchange of the device, the busbar 14 can remain constantly joined to the other devices 1. This results in a substantial time-saving for the installer, because it is not necessary to undo the busbar 14 from all the devices 1.

The geometric arrangement of the conductor connectors, in particular their conductor insertion guides for the conductors which are to be connected, is chosen in such a way that the longitudinal axis of a conductor which is being accommodated lies tangentially to the release circle (the circle whose center lies on the axis of rotation 6 and whose radius is the length of the straight line 5). An arrangement of this type makes it possible to disassemble the device 1 from the combination by a rotational movement about the upper seating 20 of the top-hat rail 3 without the need to remove the busbar 14 from other devices 1.

The invention claimed is:

1. An electrical device comprising:
   a top-hat rail mount; and
   a first conductor connector including a clamping point, a conductor being fixable via the clamping point, the electrical device being joinable to a top-hat rail via a rotational movement about an axis of rotation at the top-hat rail mount, the first conductor connector, on a second side of the electrical device, being shaped and arranged such that, in a state where the device is joined to the top-hat rail by way of the top-hat rail mount, a longitudinal axis of the conductor accommodated in the first conductor connector is essentially perpendicular to a straight line aligned orthogonally to the axis of rotation; the straight line passes through the axis of rotation and the clamping point, the axis of rotation lying on an end of the top-hat rail facing away from the second side.

2. The electrical device of claim 1, wherein the top-hat rail mount is arranged on a first side of the electrical device, and wherein the first conductor connector is arranged in such a way on a second side of the device, which abuts the first side of the device, that the conductor is inserted into the first conductor connector via the second side.

3. The electrical device of claim 2, further comprising:
   a further first conductor connector with a clamping point, wherein the further first conductor connector is shaped and arranged such that, in the state where the device is joined to the top-hat rail by way of its top-hat rail mount, the longitudinal axis of a second conductor accommodated in the further first conductor connector is essentially perpendicular to a straight line aligned orthogonally to the axis of rotation, and passes through the axis of rotation and the clamping point of the further first conductor connector, and wherein the second conductor is insertable into the further first conductor connector via the second side and the clamping points for the first conductor connectors are at the same distance from the axis of rotation.

4. The electrical device of claim 3, further comprising:
   a second conductor connector with a clamping point, wherein the second conductor connector is shaped and arranged such that, in the state where the device is joined to the top-hat rail by way of its top-hat rail mount, the longitudinal axis of a third conductor, accommodated in the second conductor connector, is essentially perpendicular to a straight line which is aligned orthogonally to the axis of rotation and passes through the axis of rotation and the clamping point of the second conductor connector, and wherein the third conductor is inserted into the second conductor connector via the second side and the distance from the clamping point of the second conductor connector to the axis of rotation is not the same as the distance from the clamping point of the first conductor connector to the axis of rotation.

5. The electrical device of claim 3, wherein the electrical device is a switching device.

6. A system comprising:
   a busbar including contact pins; and
   the electrical device of claim 3.

7. The electrical device of claim 2, further comprising:
   a second conductor connector with a clamping point, wherein the second conductor connector is shaped and arranged such that, in the state where the device is joined to the top-hat rail by way of its top-hat rail mount, the longitudinal axis of a third conductor, accommodated in the second conductor connector, is essentially perpendicular to a straight line which is aligned orthogonally to the axis of rotation and passes through the axis of rotation and the clamping point of the second conductor connector, and wherein the third conductor is inserted into the second conductor connector via the second side and the distance from the clamping point of the second conductor connector to the axis of rotation is not the same as the distance from the clamping point of the first conductor connector to the axis of rotation.

8. The electrical device of claim 7, wherein the electrical device is a switching device.

9. A system comprising:
   a busbar including contact pins; and
   the electrical device of claim 7.

10. The electrical device of claim 2, wherein the electrical device is a switching device.

11. A system comprising:
    a busbar including contact pins; and
    the electrical device of claim 2.

12. The electrical device of claim 1, wherein the electrical device is a switching device.

13. A system comprising:
    a busbar including contact pins; and
    the electrical device of claim 1.

* * * * *